March 10, 1959     H. R. HASTINGS     2,877,327
VARIABLE RESISTOR SENDING UNIT FOR GAGES
Filed Oct. 8, 1956
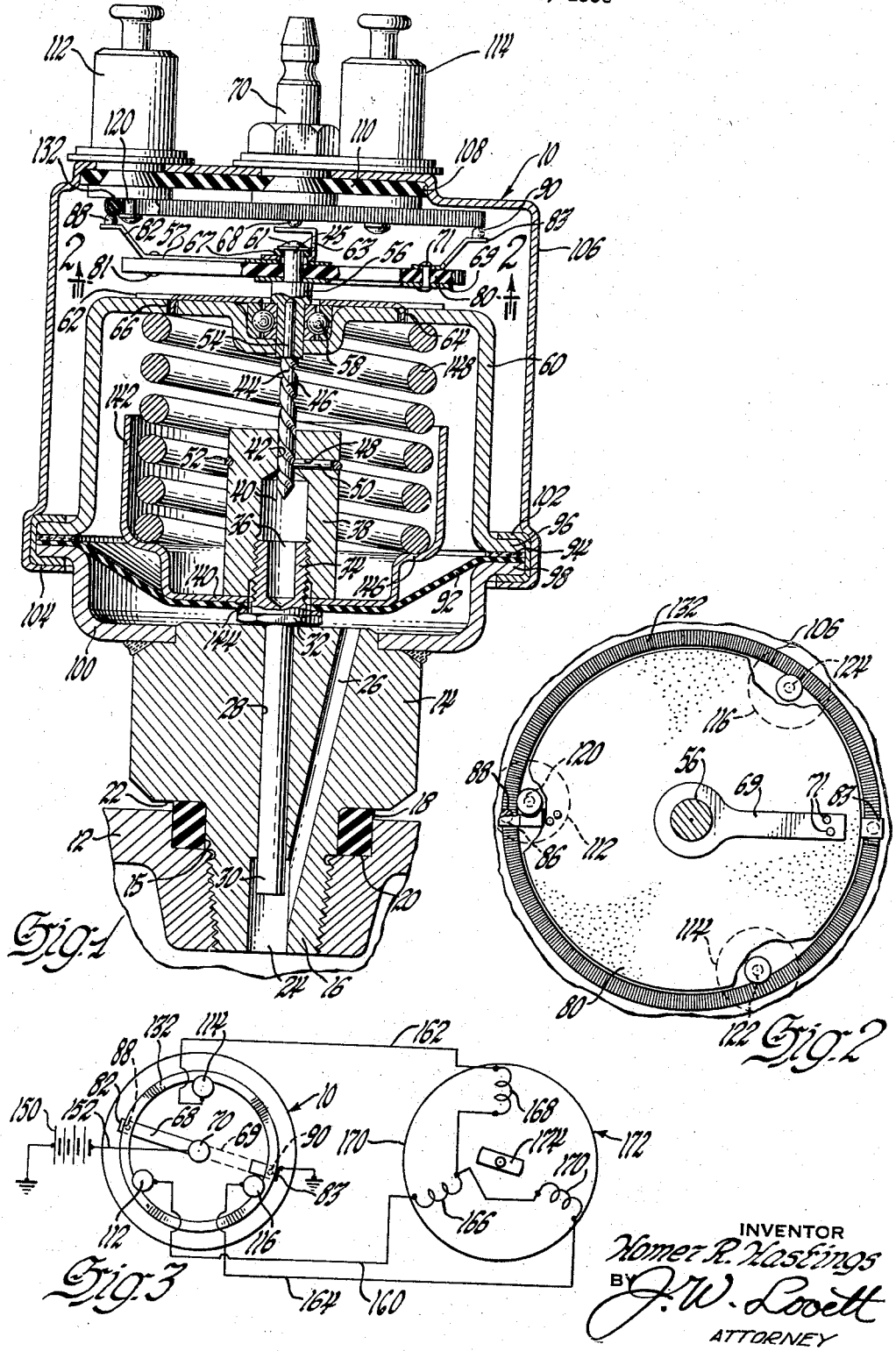
INVENTOR
Homer R. Hastings
BY J. W. Lovett
ATTORNEY

United States Patent Office 2,877,327
Patented Mar. 10, 1959

2,877,327

VARIABLE RESISTOR SENDING UNIT FOR GAGES

Homer R. Hastings, Flint, Mich., assignor to General Motors Corporation, Detroit, Mich., a corporation of Delaware Application October 8, 1956, Serial No. 614,650

4 Claims. (Cl. 201—48)

This invention relates to electrically operated gage systems and more particularly to sending units which are capable of electrically transmitting data such as pressure measurements to remotely located indicators such as pressure gages employing pointers.

Sending units have been employed heretofore in telemetric systems and such units have utilized electric resistance elements varying the current supplied to an indicator or gage in accordance with the data or measurement transmitted. A sending unit and the circuit employed for a liquid level telemetric system is disclosed in the United States Patent 2,716,685, granted August 30, 1955, in the name of Homer R. Hastings. In such systems a rotative movement of an element in a sending unit is electrically transmitted to a receiving or indicating unit. The extent of movement in the indicating unit is proportional to the extent of movement in the sending unit so that it serves to indicate data as to the pressure, temperature or other condition to which the sending unit is subjected.

An object of the present invention is to provide an improved sending unit for telemetric systems, the unit being rugged in construction, low in cost and reliable through periods of sustained usage.

To this end, one feature of the invention resides in a helical drive means actuated by a condition to be indicated to change the relative positions of contacts with respect to a resistance element included in an electric circuit of a telemetric system.

This and other important features of the invention will now be described in detail in the specification and then pointed out more particularly in the appended claims.

In the drawings:

Fig. 1 is a sectional view taken through the longitudinal axis of a pressure gage sending unit in which the present invention is embodied;

Fig. 2 is a sectional view looking in the direction of the arrows 2—2 in Fig. 1; and Fig. 3 is a diagrammatic illustration of the circuitry employed and connecting the sending and indicating units of the system.

The sending unit indicated generally at 10 in Fig. 1 is specifically adapted for transmitting data pertaining to a pressure condition within a tank or enclosure 12 to which the sending unit is attached. The unit includes a hexagonal portion 14 bearing a tapered end 16 for threaded engagement with an opening made in the tank 12. The portion 14 is reduced in cross section and made cylindrical as at 15 to receive a gasket 18 forming a seal between a shoulder portion 20 formed on the tank 12 and a shoulder 22 formed on the portion 14.

The hexagonal portion 14 is centrally apertured as at 24, and from this aperture a passage 26 is formed which is inclined with the axis of the portion 14 and extends to the other end thereof. The bore 24 is reduced in diameter as at 28 to receive a longitudinally slidable pin member 30. This member has a hexagonal portion 32 normally resting on one end surface of the portion 14—i. e.—when no pressure is present within the tank 12. The pin member 30 also is provided with a threaded upper end portion 34 which is centrally apertured as at 36 and is exteriorly threaded for engagement with a cylindrical block 38. The latter defines a chamber 40 in alignment with the recess 36 and also with a reduced axial passage 42 formed in the upper end of the block 38. The latter passage is cylindrical and slidably receives a spindle 44 bearing a helical groove 46. A radial passage 48 extends into the block 38 and communicates with the axial passage 42. The radial passage retains a pin 50, the end of which is adapted to ride in the helical groove 46. A snap ring 52 is utilized to hold the pin 50 in engagement with the spindle 44. It will be appreciated that one or more pins 50 may be utilized to constitute the helical drive as will appear more clearly as the description proceeds.

An upper end portion 54 of the spindle 44 is reduced in size and tightly driven into a recess formed in a tub 56 supported by means of a ball bearing 58 on the upper wall of an inverted cup 60. A retainer plate 62 is provided with downturned tongues 64 and 66 which are in tight relation with recesses formed in the cup. The upper end of the spindle 44 is reduced as at 45 and is provided with a head 61 for retaining one leg of a contact 63, an insulating washer 67, a contact arm 57, a circular plate 80 of dielectric material and a second contact arm 69. One leg of the contact 63 is adapted resiliently to bear against a tip 68 of a central terminal member 70. The contact is insulated from the spindle 44 by means of a clearance space around the reduced portion 45, the washer 67 and the plate 80. The arm 69 contacts the spindle hub 56 to constitute a ground.

The circular plate 80 of dielectric material such as plastic is rigidly fixed to the spindle portion 56 to rotate therewith, and the arms 57 and 69 are also rotatable with the plate. The arm 57 is riveted to the plate 80 as at 81 and carries an upwardly extending contact portion 82. A similar contact portion 83 is diametrically opposed to the portion 82 and is connected to the arm 69 by rivets 71 passing through the plate 80. The portions 82 and 83 bear ball-like protuberances 88 and 90. It will be understood that with this arrangement the ball-like protuberances 88 and 90 extend upwardly and are spaced 180 degrees apart around the axis of the spindle 44 and are adapted to rotate as a unit with the dielectric plate 80.

The peripheral margin of a diaphragm 92 is confined together with a sealing gasket 94 between a flange 96 formed on the cup 60 and a flange 98 formed around a lower cup 100. The flanges 96 and 98 are retained by an annular locking member 102 crimped about the flanges and the lower marginal portion 104 of an inverted cup-like housing 106 is crimped about the member 102 to hold the three cups 60, 100 and 106 together as a unit. The upper wall of the cup 106 is recessed as at 108 to receive a dielectric sheet 110 aiding to insulate three spaced terminals 112, 114 and 116 from each other as well as from the central terminal 70.

The bottom ends of the terminals 112, 114 and 116 are reduced as at 120, 122 and 124 and so formed as to retain an annular ring of dielectric material in fixed position within the housing 106 and in insulated relation therewith. The ring is wound with an annular resistance coil 132. As will be seen in Fig. 2, the resistance coil is of such radius that the protuberances 88 and 90 may resiliently engage it.

The diaphragm 92 is apertured to receive the threaded portion 34, and clamped between the hexagonal portion 32 and the block 38 are the diaphragm 92, the wall 140 of a cup 142 and a small gasket 144. The cup 142 is formed with an inner radial shoulder 146 upon which rests the lower end of a vertical coil spring 148. The upper end of the latter bears against the lower side of the inverted bottom of the cup 60.

In Fig. 3 the circuits are shown as deriving current from a battery 150 connected by means of a line 152 to the central terminal 70 of the sending unit 10. The spaced terminals 112, 114 and 116 are connected by means of lines 160, 162 and 164 to the coils 166, 168 and 170 of a receiving or indicating gage 172. The latter may be of the type described in the United States Patent 2,716,685, heretofore referred to. The circuits and equivalent receiving instruments are fully described in various articles such as an article entitled "Analysis and Design of D. C. Selsyn Systems," by Mr. John Manildi of the California Institute of Technology and printed from manuscripts made available on March 21, 1955, by the American Institute of Electrical Engineers at 33 West 39th Street, New York, New York. An armature 174 is shown to which an indicator pointer is fixed.

Assuming that a pressure in the tank 12 is to be indicated on the receiving or indicating unit 172, such pressure will be exerted by way of the recess 24 and passage 26 and against the underside of the diaphragm 92. As a result, the cup 142 will rise against the loading of the spring 148 and engagement of the pin 48 with the grooved spindle 44 will cause the dielectric plate 80 to rotate a distance corresponding with the pressure to be indicated. Simultaneously, current from the battery 150 will pass to the sliding contact portion 82 by way of the central terminal 70 and the U-shaped contact 63. This current will enter the resistance coil 132 at some position along the latter's length, and that current will pass along the resistance coil and through two of the terminals and their connections to the receiving unit 172. The lines 160, 162 and 164 will be subjected to the same voltage as their corresponding terminals 112, 114 and 116, and these different voltages will cause the armature 174 and, therefore, the pointer of the indicator 172 to assume a position giving the required data as to the pressure in the tank 12. With the parts positioned as in Fig. 3, the current will return by way of coil 170, line 164, contact portion 83 and arm 69 to ground.

With a lowering of the pressure in the tank 12, the spring 148 will expand until a condition of equilibrium is reached and the voltages will be varied properly to operate the instrument 172 to indicate the lowered pressure.

The rod 30 serves as a stabilizing guide for the block 38 so that various parts will remain in alignment. The cups 106 and 60, of course, should not be air tight. In the case of the cup 60, the apertures for receiving the tongues 64 and 66 constitute adequate vents. As for the cup 106, the crimping of the cup margin and the nature of the terminal attachment is such that adequate air leaks into the housing or cup 106 without special holes being made therein.

I claim:

1. A sending unit for use in a telemetric system including a housing enclosing an element linearly movable in accordance with a condition to be indicated by the system, a dielectric element mounted for rotation in said housing and carrying spaced contacts, one of said contacts being grounded, three spaced terminals on said housing adapted to be connected to a receiving unit in said system, a central terminal on said housing adapted to be connected to a current source, an annular resistance element fixedly connected at spaced points to said spaced terminals and insulated from said housing, a central contact connecting said central terminal to the other of said spaced contacts, the said spaced contacts being in contactual relation with said resistance element, and helical drive means connecting said dielectric element to said linearly movable element.

2. A sending unit for use in a telemetric system enclosing an element linearly movable in accordance with a pressure condition to be indicated by the system, a dielectric element mounted for rotation in said unit and carrying spaced contacts, one of the latter being grounded, three spaced terminals on said unit adapted separately to be connected to a receiving unit in said system, a central terminal on said housing adapted to be connected to a source of current, an annular resistance element fixedly connected at spaced points to said spaced terminals, a central contact connecting said central terminal to one of said spaced contacts, helical drive means connecting said dielectric element to said linearly movable element, and a diaphragm and spring arrangement associated with said linearly movable element.

3. A sending unit for use in a telemetric system including a housing enclosing an element linearly movable in accordance with a condition to be indicated by the system, a dielectric element mounted for rotation in said housing and carrying spaced contacts, three spaced terminals on said housing adapted to be connected to a receiving unit in said system, a central terminal on said housing adapted to be connected to a source of current, an annular resistance element fixedly connected at separate points to said spaced terminals, a central contact connecting said central terminal to one of said spaced contacts, another of said spaced contacts being connected to ground, and helical drive means connecting said dielectric element to said linearly movable element and including a helically grooved spindle fixed to said dielectric member.

4. A sending unit for use in a telemetric system including a housing enclosing an element linearly movable in accordance with a condition to be indicated by the system, a dielectric element mounted for rotation in said housing and carrying spaced contacts, three terminals fixed on said housing and adapted to be connected to a receiving unit in said system, a central terminal on said housing, an annular resistance element fixedly connected at spaced points to said spaced terminals and insulated from said housing, a central contact connecting said central terminal to one of said spaced contacts, another of said spaced contacts being connected to the said housing as a ground, helical drive means connecting said dielectric element to said linearly movable element, and a longitudinally movable rod associated with said housing for guiding said linearly movable element.

References Cited in the file of this patent

UNITED STATES PATENTS

| | | |
|---|---|---|
| 1,293,991 | Vandermyde | Feb. 11, 1919 |
| 2,120,100 | Illgew | June 7, 1938 |
| 2,537,671 | Jacks et al. | Jan. 9, 1951 |
| 2,715,685 | Hastings | Aug. 30, 1955 |